(12) United States Patent
Yoon

(10) Patent No.: US 11,641,040 B2
(45) Date of Patent: May 2, 2023

(54) BATTERY PACK

(71) Applicant: Samsung SDI Co., Ltd., Yongin-si (KR)

(72) Inventor: Jong Wook Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 103 days.

(21) Appl. No.: 16/775,696

(22) Filed: Jan. 29, 2020

(65) Prior Publication Data

US 2020/0251794 A1 Aug. 6, 2020

(30) Foreign Application Priority Data

Jan. 31, 2019 (KR) .................. 10-2019-0013092

(51) Int. Cl.
*H01M 10/6551* (2014.01)
*H01M 10/6552* (2014.01)
*H01M 50/209* (2021.01)

(52) U.S. Cl.
CPC ... *H01M 10/6551* (2015.04); *H01M 10/6552* (2015.04); *H01M 50/209* (2021.01)

(58) Field of Classification Search
None
See application file for complete search history.

(56) References Cited

U.S. PATENT DOCUMENTS 8,765,287 B2 7/2014 Kim
9,318,731 B2 4/2016 Lee et al.

2005/0231158 A1* 10/2005 Higashino ............. H01M 50/20
320/112
2006/0169507 A1* 8/2006 Inoue ................ H01M 10/6563
180/68.4
2011/0117401 A1 5/2011 Lee et al.
2013/0040181 A1 2/2013 Kim
2013/0115506 A1* 5/2013 Wayne ............. H01M 10/6555
429/120

(Continued)

FOREIGN PATENT DOCUMENTS

JP H07-14616 A 1/1995
JP 2009-009888 A 1/2009

(Continued)

OTHER PUBLICATIONS

Korean Office Action from corresponding Korean Patent Application No. 10-2019-0013092, Korean Office Action dated Mar. 12, 2021 (5 pgs.).

(Continued)

*Primary Examiner* — Lisa S Park
(74) *Attorney, Agent, or Firm* — Lewis Roca Rothgerber Christie LLP

(57) ABSTRACT

A battery pack having improved heat dissipation performance is provided. A battery pack includes battery cells; a module accommodating the battery cells and including heat dissipation members located between neighboring battery cells of the battery cells; and a duct to supply the module with coolant or absorb coolant from the module, and each of the heat dissipation members has a first region and a second region opposite to the first region, the first region having a smaller height than the second region to establish a path of the coolant.

13 Claims, 8 Drawing Sheets

(56) References Cited

U.S. PATENT DOCUMENTS

| | | | | |
|---|---|---|---|---|
| 2013/0216888 A1* | 8/2013 | Shimura | ............... | H01M 10/61 429/120 |
| 2014/0165597 A1* | 6/2014 | Hernon | ............. | H01M 10/6572 62/3.2 |
| 2015/0200429 A1* | 7/2015 | Lee | ..................... | H01M 10/613 429/120 |

FOREIGN PATENT DOCUMENTS

| | | | |
|---|---|---|---|
| JP | 2016-115481 A | 6/2016 |
| JP | 2016-186900 A | 10/2016 |
| KR | 10-2011-0055371 A | 5/2011 |
| KR | 20-2013-0002117 U | 4/2013 |
| KR | 10-2016-0132141 A | 11/2016 |
| KR | 10-1767633 B1 | 8/2017 |

OTHER PUBLICATIONS

Korean Office Action in corresponding Korean Patent Application No. 10-2019-0013092, Korean Office Action dated Sep. 14, 2021 (5 pgs.).

KIPO Office action dated Aug. 1, 2022 in corresponding application KR 10-2022-0090379, 6 pages.

\* cited by examiner

BATTERY PACK

CROSS-REFERENCE TO RELATED APPLICATION

This application claims priority to and the benefit of Korean Patent Application No. 10-2019-0013092, filed on Jan. 31, 2019 in the Korean Intellectual Property Office, the entire content of which is herein incorporated by reference.

BACKGROUND

1. Field

Aspects of embodiments of the present invention relate to a battery pack.

2. Description of the Related Art

Secondary batteries (or rechargeable batteries), unlike primary batteries that cannot be charged, can be charged and discharged. A low-capacity battery having a single battery cell packaged in the form of a pack may be used in a small portable electronic device, such as a cellular phone or a camcorder, while a large-capacity battery having tens of battery packs connected to one another may be widely used as a power source for driving motors, such as for an electric vehicle or a hybrid vehicle.

The secondary battery may be manufactured to have various shapes, including, for example, a cylindrical shape, a prismatic shape, or a pouch-type shape. The secondary battery is configured by accommodating an electrode assembly including a separator as an insulator positioned between positive and negative electrode plates and an electrolyte in a case and installing a cap plate on the case. A positive electrode terminal and a negative electrode terminal are connected to the electrode assembly, which may be exposed and protruded through the cap plate.

Meanwhile, battery packs having increased output power by connecting unit cells comprised of secondary batteries to one another in series, in parallel, or in series/parallel may be used in a variety of application fields. An energy storage system having many battery cells connected to one another may require, inter alia, high heat dissipation efficiency.

SUMMARY

According to an aspect of embodiments of the present invention, a battery pack having improved heat dissipation performance is provided.

According to one or more embodiments of the present invention, a battery pack includes battery cells, a module accommodating the battery cells and including heat dissipation members located between neighboring ones of the battery cells, and a duct to supply the module with coolant or absorb coolant from the module, wherein each of the heat dissipation members includes a first region and a second region opposite to the first region, the first region having a smaller height than the second region to establish a path of the coolant.

In an embodiment, each of the heat dissipation members may include a first evaporation part and a second evaporation part located along a height of the battery cells, and a heat pipe including a condensation part connecting the first evaporation part and the second evaporation part.

In an embodiment, the first evaporation part may have a smaller height than the second evaporation part.

In an embodiment, the heat pipe may be U-shaped and cover a central region of the neighboring battery cells.

In an embodiment, the second region may have a height corresponding to the height of the battery cells.

In an embodiment, the first region may have a height of 30% to 40% of that of the second region.

In an embodiment, the battery cell may include protrusion parts including protrusions or spacers located to protrude at edges of a coolant shifting area.

In an embodiment, the protrusion parts may include first protrusion parts centrally located along a height basis of the battery pack, and a second protrusion part, and a distance between each of the first protrusion parts and the second protrusion part may be greater than that between each of the first protrusion parts.

In an embodiment, the protrusion parts may be configured to have an angle of inclination toward a center of the battery cell on a horizontal basis of the battery cell.

In an embodiment, the angle of inclination may be between 15° and 20° on the horizontal basis of the battery cell.

As described above, a battery pack according to one or more embodiments of the present invention includes heat dissipation members including heat pipes having asymmetrical heights between each of battery cells, and heat dissipation using coolant and heat dissipation using the heat pipes can both be performed, thereby increasing heat dissipation performance.

In one or more embodiments, the heat pipes are arranged in a U-shaped configuration so as to cover central regions of the battery cells, thereby facilitating heat dissipation, even if swelling occurs to the battery cells.

DESCRIPTION OF REFERENCE NUMERALS

Figure 1:
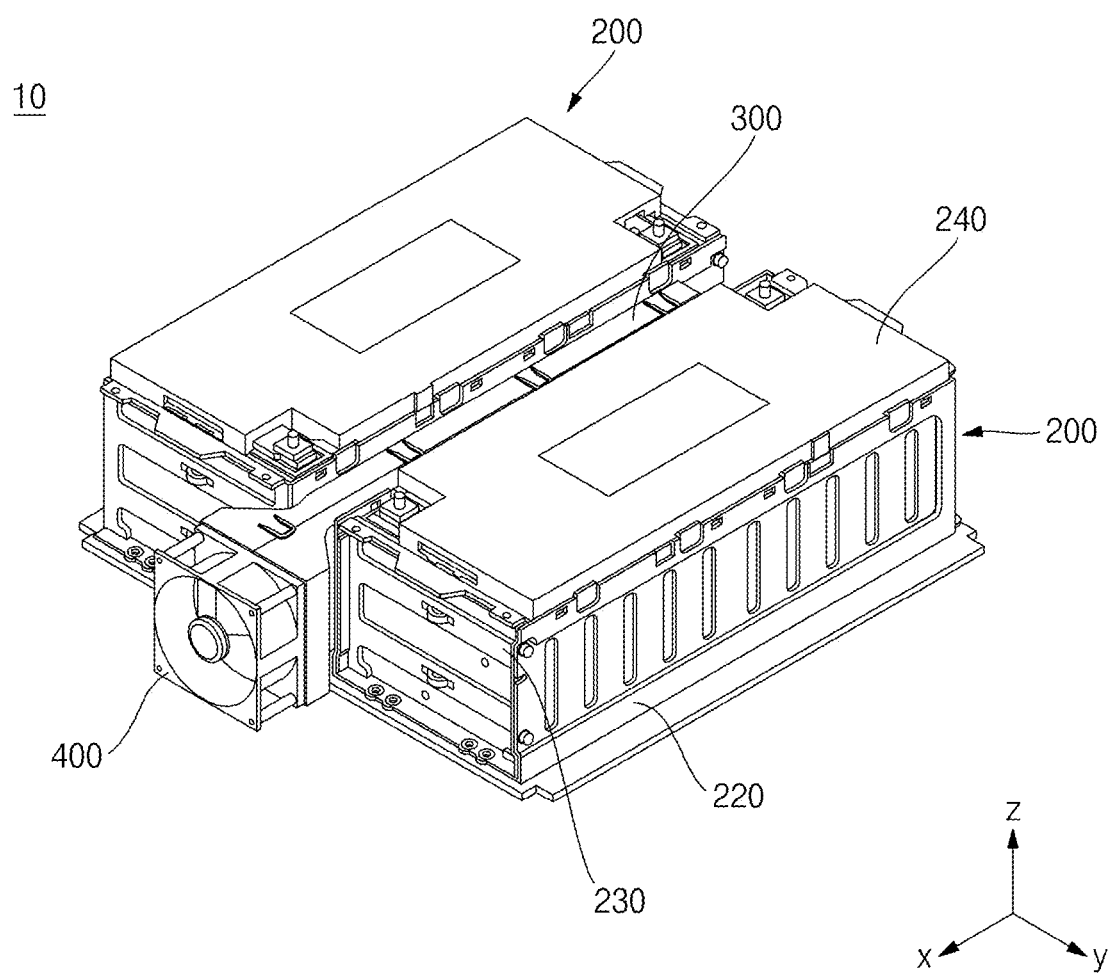
FIG. 1 is a perspective view of a battery pack according to an embodiment of the present invention.

10: Battery pack
110: Case
111a, 112a, 113a: First protrusion part
111b, 112b, 113b: Second protrusion part
111c, 112c, 113c: Third protrusion part
200: Module
211: First evaporation part
213: Condensation part
400: Air shifting member 100: Battery cells
111, 112, 113: Protrusion part 210: Heat dissipation members
212: Second evaporation part
300: Duct

DETAILED DESCRIPTION

Herein, some example embodiments of the present invention will be described in further detail. However, various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items. In addition, it is to be understood that when an element A is referred to as being "connected to" an element B, the element A may be directly connected to the element B or one or more intervening elements C may be present therebetween such that the element A and the element B are indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Unless otherwise defined, all terms (including technical and scientific terms) used herein have the same meaning as commonly understood by one of ordinary skill in the art to which this disclosure belongs. It is to be further understood that terms, such as those defined in commonly used dictionaries, should be interpreted as having a meaning that is consistent with their meaning in the context of the relevant art and are not to be interpreted in an idealized or overly formal sense unless expressly so defined herein.

Herein, a configuration of a battery pack according to an embodiment of the present invention will be described.

Figure 2:
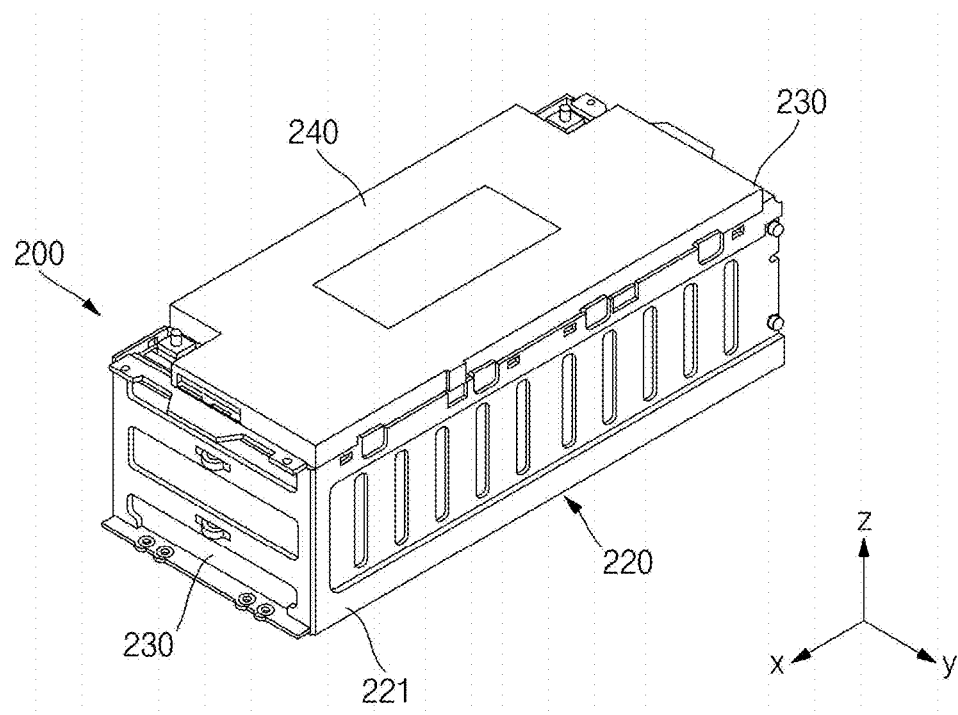
FIG. 2 is a perspective view of a module in the battery pack of FIG. 1, according to an embodiment of the present invention.
Figure 3:
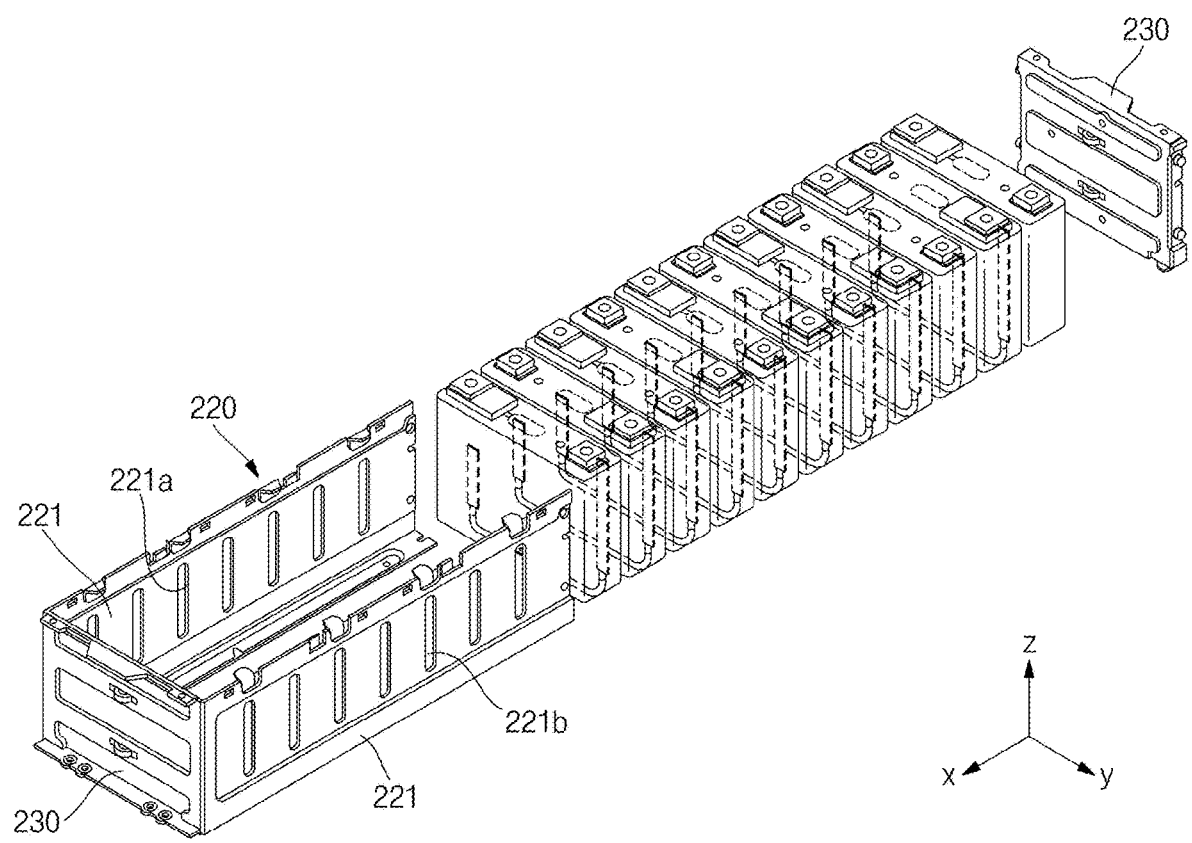
FIG. 3 is an exploded perspective view of the module in the battery pack of FIG. 2, according to an embodiment of the present invention.
Figure 4:
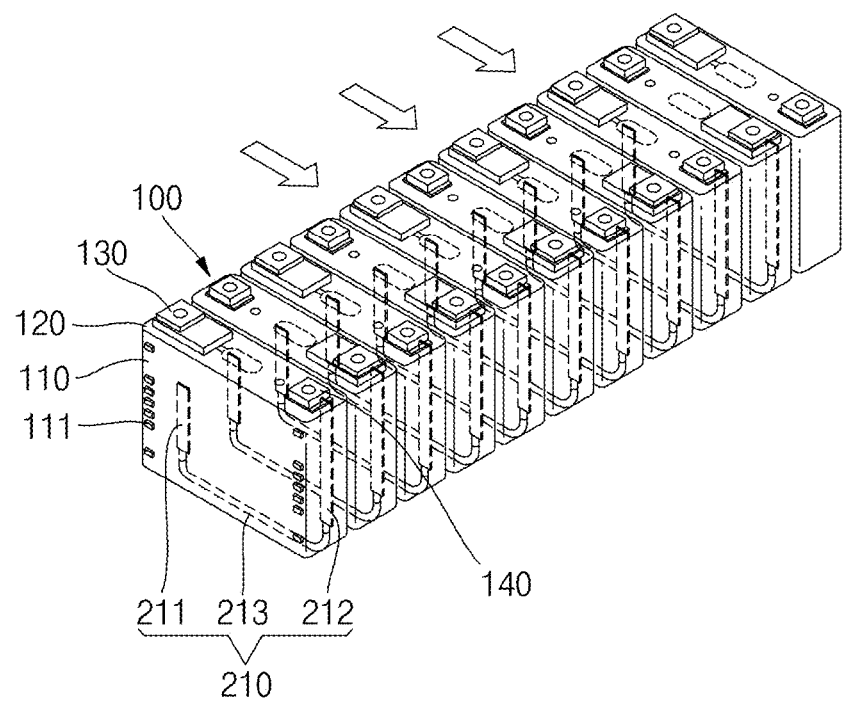
FIG. 4 is a perspective view illustrating an arrangement of battery cells and cooling members constituting the module in the battery pack of FIG. 2, according to an embodiment of the present invention.

FIG. 1 is a perspective view of a battery pack according to an embodiment of the present invention; FIG. 2 is a perspective view of a module in the battery pack of FIG. 1, according to an embodiment of the present invention; FIG. 3 is an exploded perspective view of the module in the battery pack of FIG. 2, according to an embodiment of the present invention; and FIG. 4 is a perspective view illustrating an arrangement of battery cells and cooling members of the module in the battery pack of FIG. 2, according to an embodiment of the present invention.

Referring to FIGS. 1 to 4, a battery pack 10 according to an embodiment of the present invention includes multiple battery cells 100, a module 200 accommodating the battery cells 100, a duct 300 extending along a lengthwise direction of the module 200, and an air shifting member 400 coupled to an end of the duct 300 and supplying coolant. As shown, in an embodiment, the module 200 may include a pair of modules, but the present disclosure is not limited thereto.

Each of the battery cells 100 may include a case 110 accommodating an electrode assembly (not shown) and a cap plate 120 sealing the case 110. In addition, a first terminal 130 and a second terminal 140 spaced apart from each other may be provided on the cap plate 120.

In an embodiment, the electrode assembly is provided by winding or laminating a stack of a first electrode plate, a separator, and a second electrode plate, which may include a thin plate or layers. Here, the first electrode plate may serve as a negative electrode and the second electrode plate may serve as a positive electrode, or vice versa, but this is not a limitation of the present disclosure.

In an embodiment, the first electrode plate includes a first electrode active material, such as graphite or carbon, coated on a first electrode current collector including a metal foil made of copper, a copper alloy, nickel, or a nickel alloy. The first electrode plate includes a first electrode active material layer that is a portion coated with the first electrode active material, and a first electrode uncoated portion that is not coated with the first electrode active material. The first electrode uncoated portion becomes a path of current between the first electrode plate and an exterior portion of the first electrode plate to be electrically connected to the first terminal 130.

In an embodiment, the second electrode plate includes a second electrode active material, such as a transition metal oxide, coated on a second electrode current collector including a metal foil made of aluminum or an aluminum alloy. The second electrode plate includes a second electrode active material layer that is a portion coated with the second electrode active material, and a second electrode uncoated portion that is not coated with the second electrode active material. The second electrode uncoated portion becomes a path of current between the second electrode plate and an exterior portion of the second electrode plate to be electrically connected to the second terminal 140.

The separator may be positioned between the first electrode plate and the second electrode plate to prevent or substantially prevent an electrical short from occurring therebetween, and allows lithium ions to move. In an embodiment, the separator may include polyethylene, polypropylene, or a composite film of polyethylene and polypropylene, but embodiments of the present invention are not limited to the material of the separator disclosed herein.

The electrode assembly is accommodated in the case 110 with an electrolyte. The electrolyte may include a lithium salt dissolved in an organic solvent. In addition, the electrolyte may be in a liquid, solid, or gel phase.

In an embodiment, the case 110 includes a conductive metal, such as aluminum, an aluminum alloy, or nickel plated steel, and has a substantially hexahedral shape to have a hollow opening to allow the electrode assembly to be inserted and placed. The case 110 may include two pairs of side surfaces facing each other and spaced a distance (e.g., a predetermined distance) apart from each other, and a bottom surface perpendicularly located on bottom portions of the two pairs of side surfaces. An interior surface of the case 110 is insulated such that the case 110 is insulated from the electrode assembly.

In an embodiment, protrusion parts 111a and 111b (see FIG. 5) including multiple protrusions or separate spacers may be located on front and rear surfaces having a relatively large area, among the side surfaces of the case 110. The protrusion parts 111a and 111b may be provided to guide coolant applied from between each of the battery cells 100. Configurations of the protrusion parts 111a and 111b will be described later in further detail.

The cap plate 120 may be coupled to a top portion of the case 110. In an embodiment, the cap plate 120 may be made of a same material as the case 110 and may seal an opening of the case 110. The cap plate 120 may be coupled to the case 110 by, for example, laser welding. Here, the cap plate 120 may have the same polarity as the second terminal 140. In this case, the cap plate 120 and the case 110 may have the same polarity.

In an embodiment, the cap plate 120 may include a gasket formed between each of the electrode terminals 130 and 140 and the cap plate 120, a plug closing an electrolyte injection hole, and a safety vent configured to be opened when an internal pressure of the battery cell exceeds a reference pressure.

The module 200 may accommodate multiple battery cells 100. The module 200 may include multiple heat dissipation members 210 arranged between each of the battery cells 100, a module case 220 accommodating the battery cells 100 and the heat dissipation members 210, a pair of end plates 230 coupled to ends of the module case 220, and a module cover 240 fastened with a top portion of the module case 220.

Here, the heat dissipation members 210 may be positioned between each of the multiple battery cells 100. The heat dissipation members 210 are located along the side surfaces of the battery cells 100. The heat dissipation members 210 are arranged between each of neighboring battery cells 100 closely contacting each other. In addition, the heat dissipation members 210 contact the case 110 of each of the battery cells 100, thereby cooling the battery cells 100.

In an embodiment, each of the heat dissipation members 210 may include a heat pipe. A working fluid is contained in the heat dissipation members 210. In addition, each of the heat dissipation members 210 may include a pair of evaporation parts 211 and 212 and a condensation part 213 located therebetween.

In an embodiment, the evaporation parts 211 and 212 may include a first evaporation part 211 and a second evaporation part 212, and, as shown, may be configured such that the first evaporation part 211 positioned at a region where a coolant, for example a cooling air, is applied from the duct 300 has a smaller height than the second evaporation part 212 opposite to the first evaporation part 211. Accordingly, the coolant passing the duct 300 between each of the battery cells 100 may be supplied through an upper space of the first evaporation part 211. The case 110 of each of the battery cells 100 may be primarily cooled using the coolant.

In an embodiment, the first evaporation part 211 may be provided to have a height of 30% to 40% of that of the second evaporation part 212. If the height of the first evaporation part 211 is greater than or equal to 30% of that of the second evaporation part 212, cooling efficiency of the first evaporation part 211 can be increased. If the height of the first evaporation part 211 is less than 40% of that of the second evaporation part 212, the coolant is suitably applied from the duct 300 to an upper portion of the first evaporation part 211, thereby increasing primary cooling efficiency using the coolant.

Meanwhile, the coolant is then blocked by the second evaporation part 212 to be guided to bottom ends of the battery cells 100, thereby secondly cooling the condensation part 213 of the heat dissipation member 210. In addition, the evaporation parts 211 and 212 of the heat dissipation member 210 are brought into close contact with the case 110 of the battery cell 100. Therefore, when the heat generated from the battery cell 100 is transferred from the case 110, the working fluid in the evaporation parts 211 and 212 is evaporated by the transferred heat to generate a vapor, thereby secondly cooling the case 110 of the battery cell 100. Meanwhile, the vapor in the heat dissipation members 210 may be rapidly shifted to the condensation part 213 due to a pressure difference.

In addition, as the condensation part 213 condenses the vapor in the heat dissipation members 210 through the coolant applied from the duct 300, the condensed vapor undergoes a phase transformation into the working fluid.

Through such a procedure, the battery pack 10 according to an embodiment of the present invention performs both of a primary cooling operation using the coolant and a secondary cooling operation using the heat dissipation members 210 including heat pipes, thereby improving heat dissipation performance.

In an embodiment, the module case 220 may include a pair of side plates 221 facing each other. The side plates 221 may accommodate the battery cells 100 and the heat dissipation members 210 in a space defined thereby. In addition, the module case 220 may further include a bottom surface protruding a length (e.g., a predetermined length) from bottom ends of the side plates 221, thereby exposing portions (e.g., predetermined portions) of the battery cells 100 while supporting the bottom surfaces of the battery cells 100. In an embodiment, the module case 220 may further include a separate bottom plate for creating the bottom surface, in addition to the side plates 221, but the present disclosure is not limited thereto.

In an embodiment, the side plates 221 may include first dissipation holes 221a located on a first surface contacting the duct 300 at an interval (e.g., a constant interval). The coolant in the duct 300 may be applied to the module case 220 through the first dissipation holes 221a. In addition, in order to increase cooling efficiency, the first dissipation holes 221a of the side plates 221 may be arranged at locations corresponding to the heat dissipation members 210 positioned between each of the battery cells 100. Therefore, the coolant having passed the first dissipation holes 221a of the side plates 221 may be directly supplied to the heat dissipation members 210, thereby more efficiently cooling the battery cells 100.

In an embodiment, second dissipation holes 221b may further be provided on a second surface opposite to the first surface of the side plates 221. The second dissipation holes 221b may be provided so as to correspond to the first dissipation holes 221a. In addition, the second dissipation holes 221b may create an exhaust path of the coolant having shifted to lower sides of the battery cells 110 while cooling the condensation part 213 of the heat dissipation member 210. That is, the coolant may be applied from the duct 300 through the first dissipation holes 221a of the side plates 221 to perform cooling operations on the battery cells 110 and the condensation part 213 of the heat dissipation member 210, and may then be exhausted through the second dissipation holes 221b of the side plates 221. In an embodiment, heat dissipation holes may be additionally provided on the bottom surface between each of the side plates 221, and the coolant may be divided to then be exhausted through the heat dissipation holes provided on the bottom surface.

The end plates 230 may be substantially shaped as plates and may be coupled to opposite ends of the side plates 221. However, for the sake of convenience in the manufacture of a battery pack, the battery pack may be assembled such that one of the end plates 230 is first coupled to the side plates 221 to define contours of the overall shape of the module case 220, the battery cells 100 and the heat dissipation members 210 are then inserted into the module case 220, and the other of the end plates 230 is finally coupled to the side plates 221.

The module cover 240 is coupled to top ends of the side plates 221 of the module case 220 and the end plates 230. The module cover 240 may cover top portions of the modules 200 to prevent or substantially prevent the battery cells 100 and the heat dissipation members 210 from being exposed and to prevent or substantially prevent impacts from being applied thereto.

The duct 300 may be provided between the pair of modules 200. A cooling fan of the air shifting member 400 may be coupled to an end of the duct 300 to supply coolant to the duct 300. In addition, the duct 300 may be provided with a path extending long between the modules 200 and may supply the coolant, for example a cooling air, from the air shifting member 400 to the modules 200 through holes (not shown) arranged at opposite side portions.

The air shifting member 400 may be coupled to a region corresponding to each of the end plates 230 of the module 200. In an embodiment, the air shifting member 400 may be coupled to a region corresponding to an end of the duct 300. Therefore, the air may be induced to or released from the duct 300 by the operation of the air shifting member 400.

In an embodiment, the air shifting member 400 may be provided as a blow type air shifting member, for example, a cooling fan.

In a case of the blow type air shifting member, external coolant is induced to the path of the duct 300 by the operation of the air shifting member 400. In addition, the air is induced into the modules 200 through the heat dissipation holes of the duct 300, thereby cooling the battery cells 100.

To perform a cooling operation another way, the air shifting member 400 may be provided as a suction type air shifting member to absorb external air to supply the duct 300 with the external air.

In a case of the blow type air shifting member, the external coolant is absorbed through the second dissipation holes 221b provided in the side plates 220 of the module 200 by a negative pressure of the air shifting member 400 to cool the condensation part 213 of the heat dissipation member 210 and the case 110 of each of the battery cells 100, and is then shifted to the first dissipation holes 221a of the side plates 220. In addition, the coolant is finally shifted to the air shifting member 400 through the duct 300 to then be exhausted again.

The suction-type air shifting member 400 is configured the other way from the blow-type air shifting member 400 in terms of the flow of the external coolant. In this case, however, the cooling operation may be applied in the same manner to both types of the air shifting member 400. That is, the battery cells 100 may be cooled using the external coolant or may be cooled by cooling the condensation part 213 of the heat dissipation member 210.

Herein, a heat dissipation process of cooling members in a battery pack according to an embodiment of the present invention will be described in further detail.

Figure 5:
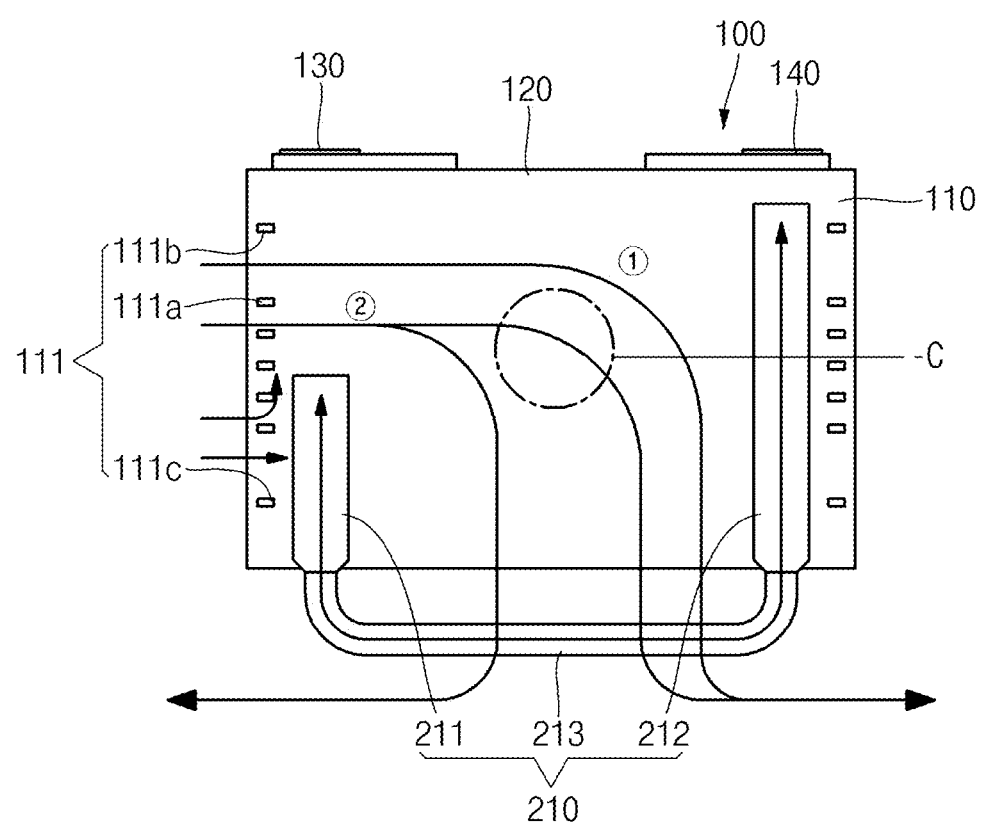
FIG. 5 is a front view illustrating an arrangement of battery cells and cooling members of a module in a battery pack according to an embodiment of the present invention.
Figure 6:
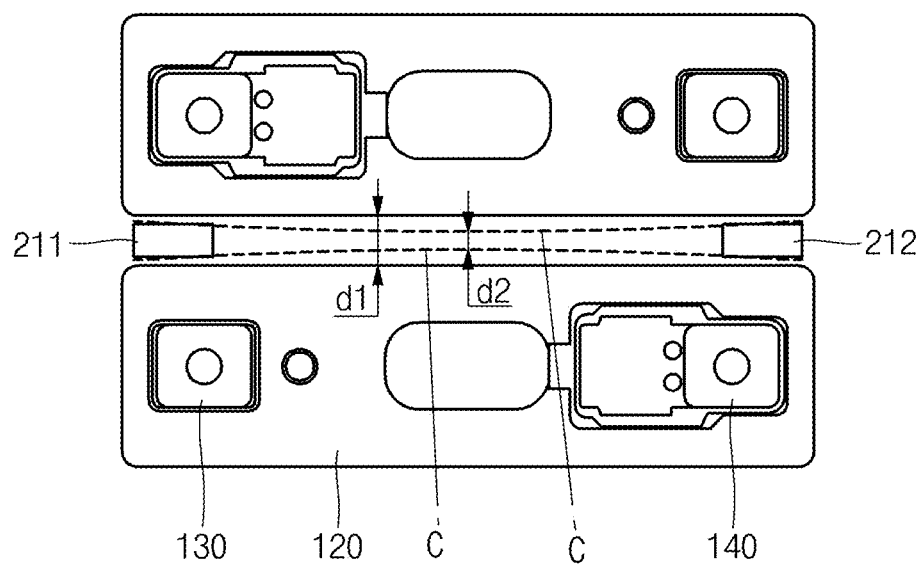
FIG. 6 is a plan view illustrating an arrangement of battery cells and cooling members in a battery pack according to an embodiment of the present invention.

FIG. 5 is a front view illustrating an arrangement of battery cells and cooling members of a module in a battery pack according to an embodiment of the present invention; and FIG. 6 is a plan view illustrating an arrangement of battery cells and cooling members in the battery pack according to an embodiment of the present invention.

Referring first to FIG. 5, multiple protrusion parts 111a, 111b, and 111c may be provided on a surface of the case 110 of each of the battery cells 100. While the protrusion parts 111a and 111b integrally formed on the surface of the case 110 have been described and illustrated as an example, separate members, such as spacers, may be provided to be coupled to the battery cells 110.

In an embodiment, the protrusion parts 111a, 111b, and 111c may include first protrusion parts 111a located approximately at a center in the height direction of the case 110, a second protrusion part 111b located at an upper side of the case 110, and a third protrusion part 111c located at a lower side of the case 110.

In an embodiment, the third protrusion part 111c is positioned lower than the first evaporation part 211 of the heat dissipation members 210, such that the coolant from the duct 300 may not be generally induced into a space between each of the first protrusion parts 111a and the third protrusion part 111c. Therefore, the coolant from the duct 300 may be generally applied to a space between each of the first protrusion parts 111a or to a space between each of the first protrusion parts 111a and the second protrusion part 111b.

In an embodiment, the space between each of the first protrusion parts 111a may be smaller than that between each of the first protrusion parts 111a and the second protrusion part 111b or between each of the first protrusion parts 111a and the third protrusion part 111c. With this configuration, a larger amount of the coolant from the duct 300 may be induced into the space between each of the first protrusion parts 111a located at the center of each of the battery cells 110 than to the space between the first protrusion part 111a located at the upper side of each of the battery cells 110 and the second protrusion part 111b.

In addition, as shown in FIG. 5, a coolant shifting path ①, which extends through the space between the first protrusion part 111a located at the upper side of the battery cell 110 and the second protrusion part 111b, may have a longer and wider cooling area than a coolant shifting path ②, which extends through the space between the first protrusion parts 111a located at the center of the battery cell 110.

Therefore, as described above, a relatively large amount of coolant may be induced through the relatively wide space between the first protrusion part 111a and the second protrusion part 111b, thereby achieving uniform or substantially uniform cooling performance.

Referring again to FIG. 5, in an embodiment, the heat dissipation member 210 may have a U-shaped configuration and may cover a central region of the battery cell 100.

Referring to FIG. 6, a distance d1 between the battery cells 100 spaced apart from each other by the heat dissipation member 210 may be greater than a distance d2 between central regions C of the cases 110 of the spaced-apart battery cells 100, when swollen due to swelling occurring to the battery cells 100. Therefore, even if swelling occurs to the battery cells 100, a space between the cases 110 can be secured, thereby securing cooling operations using the coolant and the heat dissipation member 210. Therefore, swelling of the battery cells 100 can be safely suppressed.

In an embodiment, although not separately shown, a separate member, such as a heat dissipation pin or a heat dissipation plate, may be further coupled to a lower side of the condensation part 213 of the heat dissipation member 210, thereby more efficiently cooling the working fluid.

Herein, a configuration of a battery pack according to another embodiment of the present invention will be described.

Figure 7:
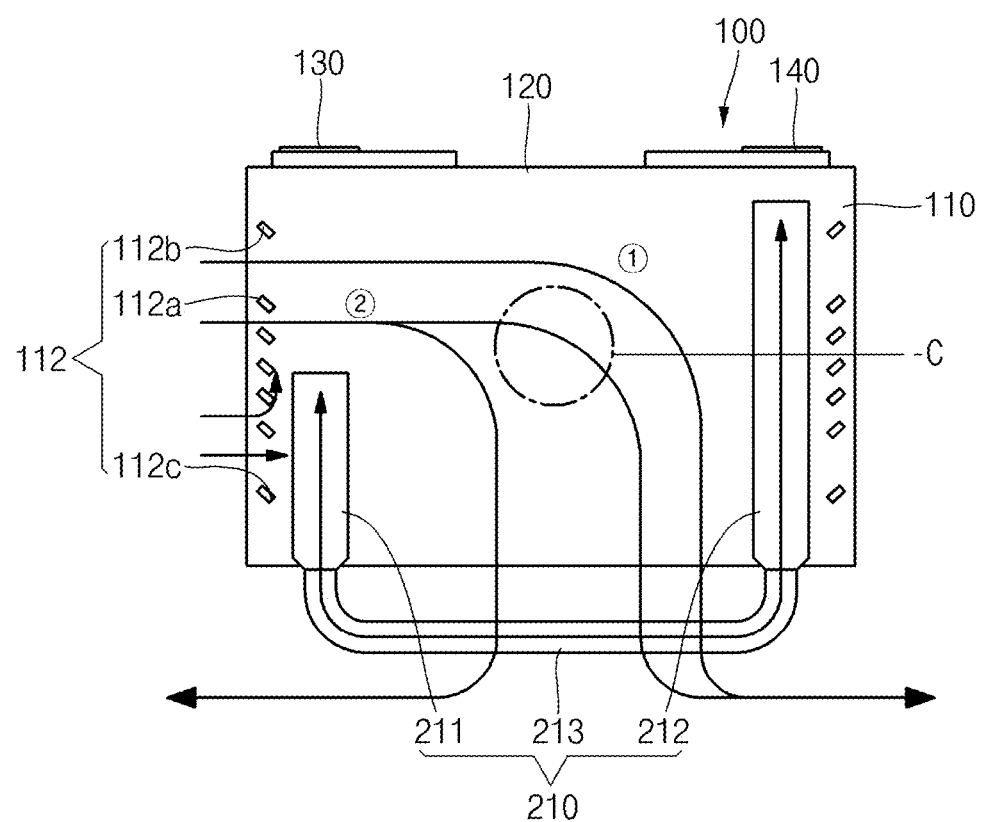
FIG. 7 is a front view illustrating an arrangement of battery cells and cooling members in a battery pack according to another embodiment of the present invention.

FIG. 7 is a front view illustrating an arrangement of battery cells and cooling members in a battery pack according to another embodiment of the present invention.

Referring to FIG. 7, a battery pack according to another embodiment of the present invention includes protrusion parts 112 including protrusions located in each battery cell 100 or separate spacers. Unlike the previously described embodiment, the protrusion parts 112 are configured to have an angle of inclination toward the central lower side of the battery cell 100 on a horizontal basis.

In an embodiment, as shown in FIG. 7, the protrusion parts 112 include first protrusion parts 112a, a second protrusion part 112b, and a third protrusion part 112c, and each of the protrusion parts 112a, 112b, and 112c defines an angle of inclination toward the central lower side of the battery cell 100. In an embodiment, the angle of inclination may be in a range from between 15° and 20° on the horizontal basis of the battery cell 100.

If the angle of inclination is greater than or equal to 15°, the coolant applied to a space between the battery cells 100 is allowed to be concentrated on the center C of each of the battery cells 100, thereby preventing or substantially preventing swelling from occurring to the battery cells and increasing cooling efficiency. If the angle of inclination is less than or equal to 20°, the cooling efficiency can be increased without blocking the flow of coolant.

Herein, a configuration of a battery pack according to another embodiment of the present invention will be described.

Figure 8:
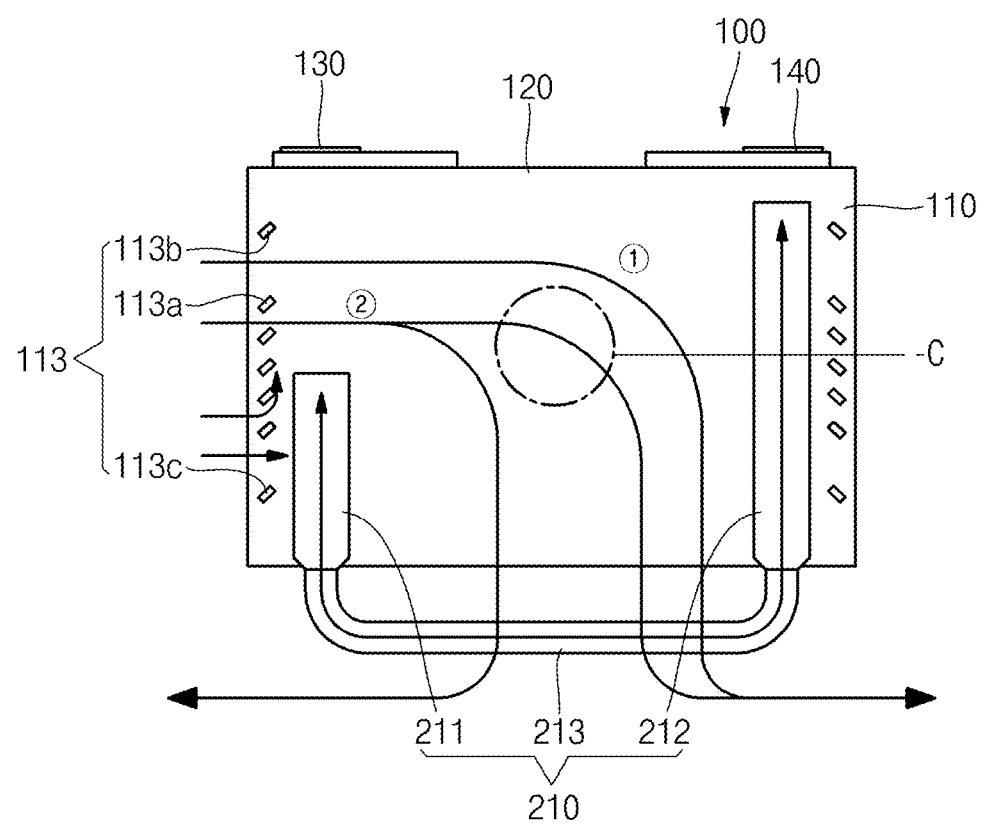
FIG. 8 is a front view illustrating an arrangement of battery cells and cooling members in a battery pack according to another embodiment of the present invention.

FIG. 8 is a front view illustrating an arrangement of battery cells and cooling members in a battery pack according to another embodiment of the present invention.

Referring to FIG. 8, a battery pack according to another embodiment of the present invention includes protrusion parts 113 including protrusions located in a battery cell 100 or a separate spacer. Here, the protrusion parts 113 are configured to have an angle of inclination toward a central upper side of the battery cell 100 on a horizontal basis, unlike in the previously described embodiment.

In an embodiment, the protrusion parts 113 include first protrusion parts 113a, a second protrusion part 113b, and a third protrusion part 113c, and each of the protrusion parts 113a, 113b, and 113c defines an angle of inclination toward the central upper side of the battery cell 100. In an embodiment, the angle of inclination may be in a range from between 15° and 20° on the horizontal basis of the battery cell 100.

If the angle of inclination is greater than or equal to 15°, the coolant applied to between the battery cells 100 is allowed to perform a cooling operation on the battery cells 100 from upper sides thereof, thereby uniformly or substantially uniformly cooling the battery cells. If the angle of inclination is less than or equal to 20°, the applied coolant is shifted toward the center C of each of the battery cells 100, thereby effectively preventing or substantially preventing swelling from occurring to the battery cells 100.

While the foregoing example embodiments have been described to practice the battery pack of the present invention, it will be understood by those of ordinary skill in the art that various changes in form and details may be made therein without departing from the spirit and scope of the present invention as set forth in the following claims.

What is claimed is:

1. A battery pack comprising:
   battery cells spaced along a first direction;
   a module accommodating the battery cells and comprising heat dissipation members located between neighboring battery cells of the battery cells; and
   a duct to supply the module with coolant or absorb coolant from the module,
   wherein each of the heat dissipation members comprises a first region, a second region opposite to and spaced apart from the first region along a second direction crossing the first direction, and a third region connecting the first region and the second region and located between the first region and the second region along the second direction, the first region including a first end of the heat dissipation member and the second region including a second end of the heat dissipation member, the first region extending away from the third region in a third direction to the first end that is distal from the third region, the third direction crossing each of the first direction and the second direction, and the second region extending away from the third region in the third direction to the second end that is distal from the third region, the first end being located at a smaller height than the second end along the third direction to establish a path of the coolant outside the heat dissipation member between and overlapping along the first direction a front surface of a respective first battery cell of the neighboring battery cells and a rear surface of a respective second battery cell of the neighboring battery cells that are spaced apart in the first direction, the first region and the second region being located between the front surface of the respective first battery cell and the rear surface of the respective second battery cell, wherein the path of the coolant outside the heat dissipation member is separated from a path of a coolant outside another heat dissipation member.

2. The battery pack of claim 1, wherein each of the heat dissipation members comprises:
a first evaporation part and a second evaporation part located along a height of the battery cells, the first evaporation part comprising the first region, and the second evaporation part comprising the second region; and
a heat pipe comprising a condensation part connecting the first evaporation part and the second evaporation part, the heat pipe comprising the third region.

3. The battery pack of claim 2, wherein the first evaporation part has a smaller height than the second evaporation part.

4. The battery pack of claim 2, wherein the heat pipe is U-shaped and covers a central region of the neighboring battery cells.

5. The battery pack of claim 2, wherein the second region has a height corresponding to the height of the battery cells.

6. The battery pack of claim 2, wherein the first region has a height of 30% to 40% of that of the second region.

7. The battery pack of claim 2, wherein a battery cell of the battery cells comprises protrusion parts comprising protrusions or spacers located to protrude at edges of the battery cell where the duct supplies or absorbs the coolant.

8. The battery pack of claim 7, wherein the protrusion parts comprise first protrusion parts centrally located along a height of a case of the battery cell, and a second protrusion part, and a distance between each of the first protrusion parts and the second protrusion part is greater than that between each of the first protrusion parts.

9. The battery pack of claim 7, wherein the protrusion parts are configured to have an angle of inclination toward a center of the battery cell on a horizontal basis of the battery cell.

10. The battery pack of claim 9, wherein the angle of inclination is between 15° and 20° on the horizontal basis of the battery cell.

11. The battery pack of claim 1, wherein the duct supplies or absorbs the coolant so as to pass between the front surface of the respective first battery cell and the rear surface of the respective second battery cell such that the coolant overlaps with the front surface of the respective first battery cell and the rear surface of the respective second battery cell in the first direction.

12. The battery pack of claim 1, wherein the duct supplies or absorbs the coolant comprising a cooling air along the front surface of the respective first battery cell and the rear surface of the respective second battery cell.

13. The battery pack of claim 1, wherein the first end overlaps with the front surface of the respective first battery cell and the rear surface of the respective second battery cell.

* * * * *